United States Patent
Winterberg

(10) Patent No.: US 8,139,287 B2
(45) Date of Patent: Mar. 20, 2012

(54) AMPLIFICATION OF ENERGY BEAMS BY PASSAGE THROUGH AN IMPLODING LINER

(75) Inventor: Friedwardt M. Winterberg, Reno, NV (US)

(73) Assignee: Board of Regents of the Nevada System of Higher Education, on behalf of the University of Nevada, Reno, Reno, NV (US)

( * ) Notice: Subject to any disclaimer, the term of this patent is extended or adjusted under 35 U.S.C. 154(b) by 620 days.

(21) Appl. No.: 11/794,873

(22) PCT Filed: Jan. 9, 2006

(86) PCT No.: PCT/US2006/000601
§ 371 (c)(1),
(2), (4) Date: Aug. 24, 2009

(87) PCT Pub. No.: WO2006/074427
PCT Pub. Date: Jul. 13, 2006

(65) Prior Publication Data
US 2009/0303579 A1    Dec. 10, 2009

Related U.S. Application Data

(60) Provisional application No. 60/642,478, filed on Jan. 7, 2005.

(51) Int. Cl.
*H01S 3/0955* (2006.01)
*H01S 3/0937* (2006.01)
*H05H 1/22* (2006.01)
*G21B 1/03* (2006.01)
*G21B 1/23* (2006.01)

(52) U.S. Cl. ......... 359/345; 372/73; 376/103; 378/119; 315/111.01; 250/493.1

(58) Field of Classification Search ............... 359/342, 359/345; 372/69, 73, 74; 376/102–106; 378/119; 250/493.1, 503.1; *H01S 3/0937, H01S 3/0955, 3/0959*
See application file for complete search history.

(56) References Cited

U.S. PATENT DOCUMENTS 3,624,553 A * 11/1971 Van-Tran ............... 372/43.01

(Continued)

OTHER PUBLICATIONS

Nuckolls et al., Laser Compression of Matter to Super-High Densities: Thermonuclear (CTR) Applications, Nature vol. 239, 1972, pp. 129.*

(Continued)

*Primary Examiner* — Mark Hellner
*Assistant Examiner* — Ari M Diacou
(74) *Attorney, Agent, or Firm* — UNR-DRI Technology Transfer Office

(57) ABSTRACT

Apparatus and methods are disclosed for amplifying an energy beam such as a beam of laser light or a charged particle beam. An exemplary method includes providing a liner having a first end, a second end, a liner axis, and a lumen extending along the liner axis and being bound by interior reflective walls of the liner. An energy beam is introduced into the first end of the liner. The beam propagates through the lumen from the first end to the second end as the beam reflects multiple times from the interior walls of the liner. Meanwhile, an implosive force is applied to the liner. The implosive force compresses the interior walls implosively toward the liner axis in a manner that amplifies the beam as the beam propagates through the lumen of the imploding liner. The amplified energy beam can be used for any of various purposes including ignition of a fusion target.

49 Claims, 11 Drawing Sheets

U.S. PATENT DOCUMENTS

| | | | | |
|---|---|---|---|---|
| 3,823,325 | A * | 7/1974 | Wood | 372/5 |
| 3,891,941 | A * | 6/1975 | Roberts et al. | 372/56 |
| 4,016,500 | A * | 4/1977 | Pilloff | 359/337 |
| 4,158,176 | A * | 6/1979 | Hunt et al. | 359/339 |
| 4,252,607 | A * | 2/1981 | Thode | 376/105 |
| 4,263,095 | A * | 4/1981 | Thode | 376/105 |
| 4,293,794 | A * | 10/1981 | Kapetanakos | 315/111.81 |
| 4,328,070 | A * | 5/1982 | Winterberg | 376/102 |
| 4,401,618 | A * | 8/1983 | Salisbury | 376/106 |
| 4,500,843 | A * | 2/1985 | Szoke et al. | 359/335 |
| 4,511,850 | A * | 4/1985 | Schlitt et al. | 359/335 |
| 4,644,576 | A * | 2/1987 | Kuyel | 378/119 |
| 4,694,457 | A * | 9/1987 | Kelly et al. | 372/2 |
| 4,751,723 | A * | 6/1988 | Gupta et al. | 378/119 |
| 4,880,976 | A * | 11/1989 | Mancuso et al. | 250/310 |
| 4,888,522 | A * | 12/1989 | Weingart | 315/111.61 |
| 5,410,558 | A * | 4/1995 | Hackett | 372/2 |
| 5,659,173 | A * | 8/1997 | Putterman et al. | 250/361 C |
| 6,678,351 | B1 * | 1/2004 | Perry et al. | 378/119 |
| 7,321,604 | B2 * | 1/2008 | Umstadter et al. | 372/2 |
| 7,486,758 | B1 * | 2/2009 | Turchi | 376/128 |
| 7,872,555 | B2 * | 1/2011 | Kitamura et al. | 335/306 |
| 2005/0271181 | A1 * | 12/2005 | Winterberg | 376/144 |
| 2011/0182392 | A1 * | 7/2011 | Wessel et al. | 376/105 |

OTHER PUBLICATIONS

T. W. L. Sanford, T. J. Nash, R. C. Mock, R. B. Spielman, K. W. Struve et al. Dynamics of a high-power aluminum-wire array Z-pinch implosion. Phys. Plasmas 4, 2188 (1997); doi: 10.1063/1.872382.*

C. M. Fowler. Megagauss Physics. Science Apr. 20, 1973: 261-267. [DOI:10.1126/science.180.4083.261].*

Cnare, E.C., Magnetic Flux Compression by Magnetically Imploded Metallic Foils, Journal of Applied Physics 37: 3812 (1966). doi:10.1063/1.1707931.*

F. Winterberg. Laser-guided focusing of intense relativistic electron beams for fast ignition. Phys. Plasmas 11, 3955 (2004); doi:10.1063/1.1768178.*

Andrei D Sakharov. Magnetoimplosive Generators. Soviet Physics Uspekhi (1966), 9(2):294. http://iopscience.iop.org/0038-5670/9/2/A09.*

J. W. Shearer, D. A. Nowak, E. Garelis, and W. C. Condit. Intense Synchrotron Radiation From a Magnetically Compressed Relativistic Electron Layer. Lawrence Livermore Laboratory. Oct. 1975. www.osti.gov/energycitations/servlets/purl/4153920-jGwk7m/.*

Winterberg, The Physical Principles of Thermonuclear Explosive Devices, Fusion Energy Foundation, New York, 1981, p. 37 ff.*

Landau and Lifshitz, Electrodynamics of Continuous Media, Pergamon Press, New York, 1960, p. 293 ff.*

Sommerfeld, Optik, Dietrich'sche Verlagsbuchhandlung, Wiesbaden, 1950, p. 314 ff.*

C. M. Fowler, W. B. Garn, and R. S. Caird. Production of Very High Magnetic Fields by Implosion. J. Appl. Phys. 31, 588 (1960); do: 10.1063/1.1735633.*

Linhart, Plasma Physics, EURATOM, Brussels, 1969, p. 74 ff.*

* cited by examiner

AMPLIFICATION OF ENERGY BEAMS BY PASSAGE THROUGH AN IMPLODING LINER

CROSS REFERENCE TO RELATED APPLICATIONS

This application claims priority to, and the benefit of, U.S. Provisional Application No. 60/642,478, filed on Jan. 7, 2005, and International Application No. PCT/US2006/000601, filed on Jan. 9, 2006, and published as WO 2006/074427 A2 on Jul. 13, 2006, all incorporated herein by reference in their entirety.

FIELD

This disclosure pertains generally to amplification of "energy beams" (particularly but not necessarily limited to beams of electromagnetic radiation, such as laser beams, and charged-particle beams). More specifically, it pertains, inter alia, to beam amplification by passing the beam through a "liner" that is urged to undergo implosive collapse, such as by a pinch effect. The disclosure also pertains to various apparatus and methods that exploit such amplified beams.

BACKGROUND

Lasers have seemingly ubiquitous uses, but certain uses (including potential uses) hinge on an ability to achieve sufficiently high energy and/or power of the laser beam, particularly at desired wavelengths or under other constraining condition(s). For example, lasers currently are used in a variety of exposure methods that would benefit substantially from an ability to produce higher beam intensity at desired wavelengths. Another broad field in which higher-energy lasers would be useful is military applications. Yet another field is that of energy production by, for example, contained thermonuclear fusion.

With respect to the latter application, pulsed lasers have been used as drivers for inertial-confinement fusion. In such applications (as well as in various exposure applications that utilize pulsed laser beams) lasers generally exhibit good stand-off and repetition-rate properties, but the generally low efficiency with which the laser beams are produced is a detriment. As an alternative, in inertial-confinement fusion, electric-pulse-power drivers have been used, which exhibit high efficiency; but, these types of drivers suffer from problems (not yet satisfactorily solved) concerning stand-off and repetition rate.

Therefore, there is a need for improved apparatus and methods for amplifying the energy of laser beams and other energy beams for any of various uses.

SUMMARY

The present invention relates to, inter alia, amplification of a laser beam or other energy beam by pass the beam through a liner as the liner is imploding. As used herein, a "liner" is a structure having a first end and a second end and that defines a lumen into which a laser beam, or other suitable beam, can be introduced in a manner by which the beam undergoes multiple reflections from the inner walls of the structure as the beam propagates through the lumen from one end of the liner to the other end as the liner is urged to undergo implosion. The lumen generally extends along a liner axis, and in many embodiments the walls of the liner are caused to implode toward the liner axis. The liner axis can be linear or contorted so as to achieve a compact configuration, such as a helical configuration of the liner. The liner generally, but not necessarily, has dimensions that provide it with a "capillary" geometry.

According to a first aspect, methods are provided for amplifying an energy beam. An embodiment of such a method comprises providing a liner having a first end, a second end, a liner axis, and a lumen extending along the liner axis and being bound by interior reflective walls of the liner. An energy beam is introduced into the first end of the liner such that the beam propagates through the lumen from the first end to the second end as the beam reflects multiple times from the interior walls of the liner. Meanwhile, an implosive force is applied to the liner as the beam propagates through the lumen of the liner. The implosive force serves to compress the interior walls implosively toward the liner axis in a manner that amplifies the beam as the beam propagates through the lumen of the imploding liner. The energy beam can be, for example, a beam of laser light (as an exemplary beam of electromagnetic radiation) or a charged particle beam. As an example of the latter, the charged particle beam can be an electron beam, wherein reflection of the electron beam from the interior walls produces a beam of synchrotron radiation that propagates through the liner.

The implosive force can be applied to the liner by application of electric pulse power to the liner. In one embodiment the implosive force achieves a Z-pinch of the liner as the implosive force compresses the interior walls of the liner. Alternatively, the implosive force can be applied by irradiating the liner with electromagnetic radiation. Further alternatively, the implosive force can be applied by applying an ablative implosion force to the liner. Yet further alternatively, the implosive force can be applied by application of a hyper-velocity impact force to the liner.

The implosive force can be applied to the liner uniformly radially inward toward the axis, e.g., in a Z-pinch manner. In certain embodiments the implosive force is applied in a manner by which one portion of the liner implodes at a greater velocity than another portion of the liner. In other embodiments the implosive force is applied to the liner in a manner that provides the lumen with convergence or divergence that progresses from the first end to the second end as the liner is being implosively compressed. In yet other embodiments the beam, while being introduced into the lumen, is provided with a large azimuthal velocity component. In yet other embodiments the implosive force is applied to the liner in a manner in which a greater force is applied in one direction toward the axis than in another direction toward the axis.

The liner can have any of various configurations, including straight or not straight. If desired the liner can have an axially compact configuration achieve by, for example, winding the liner in the manner of a helix or analogous configuration. In the case of a helical liner, the implosive force can be applied by placing the liner in a hohlraum and applying an indirectly induced implosive force to the liner.

The liner can contain a gas that is capable, when pumped, of exhibiting laser action. The gas in the lumen can be "pumped" (in a laser-pumping sense) to convert the gas to a second-stage laser having lower energy but higher photon number. The second-stage laser can be used for transforming the introduced beam, having high energy and low intensity, into a beam having low energy and high intensity exiting the liner. In other embodiments, the liner can contain a gas that exhibits a non-linear dependence of refractive index (n) on laser-light intensity, resulting in n$\gg$1, so as to increase a ratio of implosion velocity over the velocity of light c/n by n.

The liner can be intrinsically reflective to the energy beam. In certain embodiments, the interior reflective walls are coated with a resonant fluorescent layer having a refractive index n>1.

In certain embodiments the liner can be surrounded by one or more shells. Before or while applying the implosive force, the liner and shell(s) can be placed in an axial magnetic field to form a cushion between the shells during implosion.

According to another aspect, apparatus are provided for amplifying an energy beam. An embodiment of such an apparatus comprises a liner. The liner comprises a first end, a second end, and walls that include interior surfaces defining a lumen extending along an axis, wherein the interior surfaces are reflective to an energy beam. The apparatus also comprises a means for introducing an energy beam into the first end of the liner such that the beam propagates through the lumen from the first end to the second end as the beam reflects multiple times from the interior surfaces. The apparatus also comprises implosion means for applying an implosive force to the liner as the beam propagates through the lumen. The implosive force is sufficient to compress the walls toward the axis in a manner that amplifies the beam as the beam propagates through the lumen. As noted above, the energy beam can be a beam of electromagnetic radiation (such as a laser beam) or a charged particle beam (such as an electron beam).

The liner can have any of various configurations before compression, such as a cylindrical transverse profile or a profile having a non-circular transverse section, such as a lenticular or star-shaped section. The liner can be configured to exhibit, during compression of the liner, divergence or convergence from the first end to the second end. The liner can comprise at least one surrounding shell that is compressed, along with the liner, by the implosion force applied by the implosion means. The can be axially compacted, such as having a helical configuration.

In certain embodiments the implosion means comprises a hohlraum, into which the liner is placed for application of the implosive force. Such an embodiment further comprises means for applying a burst of radiation to the liner in the hohlraum.

The lumen of the liner can be configured to exploit a shape-change effect during implosion of the liner. For example, the lumen can have a diamond- or star-shaped transverse section that changes shape during implosion.

The liner can comprise at least one metal so as to confer a desired reflectivity to the walls of the liner. In certain embodiments the lumen of the liner contains a gas having a non-linear dependence of refractive index (n) on the laser-light intensity, resulting in n>>1. In other embodiments the interior surfaces of the liner are coated with a reflection-enhancing substance. The reflection-enhancing substance can be, for example, a resonant fluorescent material having a refractive index n>1.

The walls of the liner, including the interior surfaces, can have any of various surficial configurations. For example, the walls can be screw-shaped.

The apparatus further can comprise a hohlraum that contains the liner. In such an embodiment the implosion means applies the implosive force to the liner in the hohlraum.

The implosion means can be configured to apply, for example, a Z-pinch implosive force to the liner. This is an example of a "direct drive" implosion of the liner. As an example of an "indirect drive," the implosion means can comprise means for ablatively imploding the liner. The means for ablatively imploding the liner can comprise a hohlraum and means for producing in the hohlraum a burst of black-body radiation (e.g., soft X-ray radiation) directed to the liner.

According to yet another aspect, methods are provided for igniting a fusion target. An embodiment of such a method comprises providing a liner having a first end, a second end, a liner axis, and a lumen extending along the liner axis and being bound by interior reflective walls of the liner. An energy beam (e.g., a beam of electromagnetic radiation such as a laser beam or a charged particle beam such as an electron beam) is introduced into the first end of the liner such that the beam propagates through the lumen from the first end to the second end as the beam reflects multiple times from the interior walls of the liner. An implosive force is applied to the liner as the beam propagates through the lumen of the liner. The implosive force serves to compress the interior walls implosively toward the liner axis in a manner that amplifies the beam as the beam propagates through the lumen of the imploding liner, thereby producing an amplified beam. The amplified beam is directed to the fusion target so as to ignite the target. The target can be, for example, an inertial-confinement fusion target.

Another aspect is directed to apparatus for igniting a fusion target. An embodiment of such an apparatus comprises a liner as summarized above. The embodiment also includes means for introducing an energy beam into the first end of the liner such that the beam propagates through the lumen from the first end to the second end as the beam reflects multiple times from the interior surfaces. The apparatus also includes implosion means for applying an implosive force to the liner as the beam propagates through the lumen. The implosive force is sufficient to compress the walls toward the axis in a manner that amplifies the beam as the beam propagates through the lumen, thereby producing an amplified energy beam. The embodiment also includes means for directing the amplified energy beam to a fusion target. The apparatus can include a hohlraum, wherein both the liner and the fusion target are imploded in the hohlraum.

An amplified energy beam produced as described herein can be used for any of various applications, not limited to fusion-target ignition as summarized above. By way of example, the amplified beam can be used for any of various illumination purposes such as in lithographic exposure, microscopy, military applications, facilitation of chemical reactions, industrial processes, and non-destructive testing.

The foregoing and additional features and advantages of the invention will be more readily apparent from the following detailed description, which proceeds with reference to the accompanying drawings.

DETAILED DESCRIPTION

This disclosure is set forth in the context of representative embodiments that are not intended to be limiting in any way. I.e., the following description of representative embodiments is not intended to limit the scope of the invention to the specifically described embodiments, but rather to enable any person skilled in the art to make and use the invention. As will be recognized by any person skilled in the relevant art, modifications and changes can be made to the described embodiments without departing from the scope of the invention as defined in the appended claims.

Laser Amplification

Figure 1:
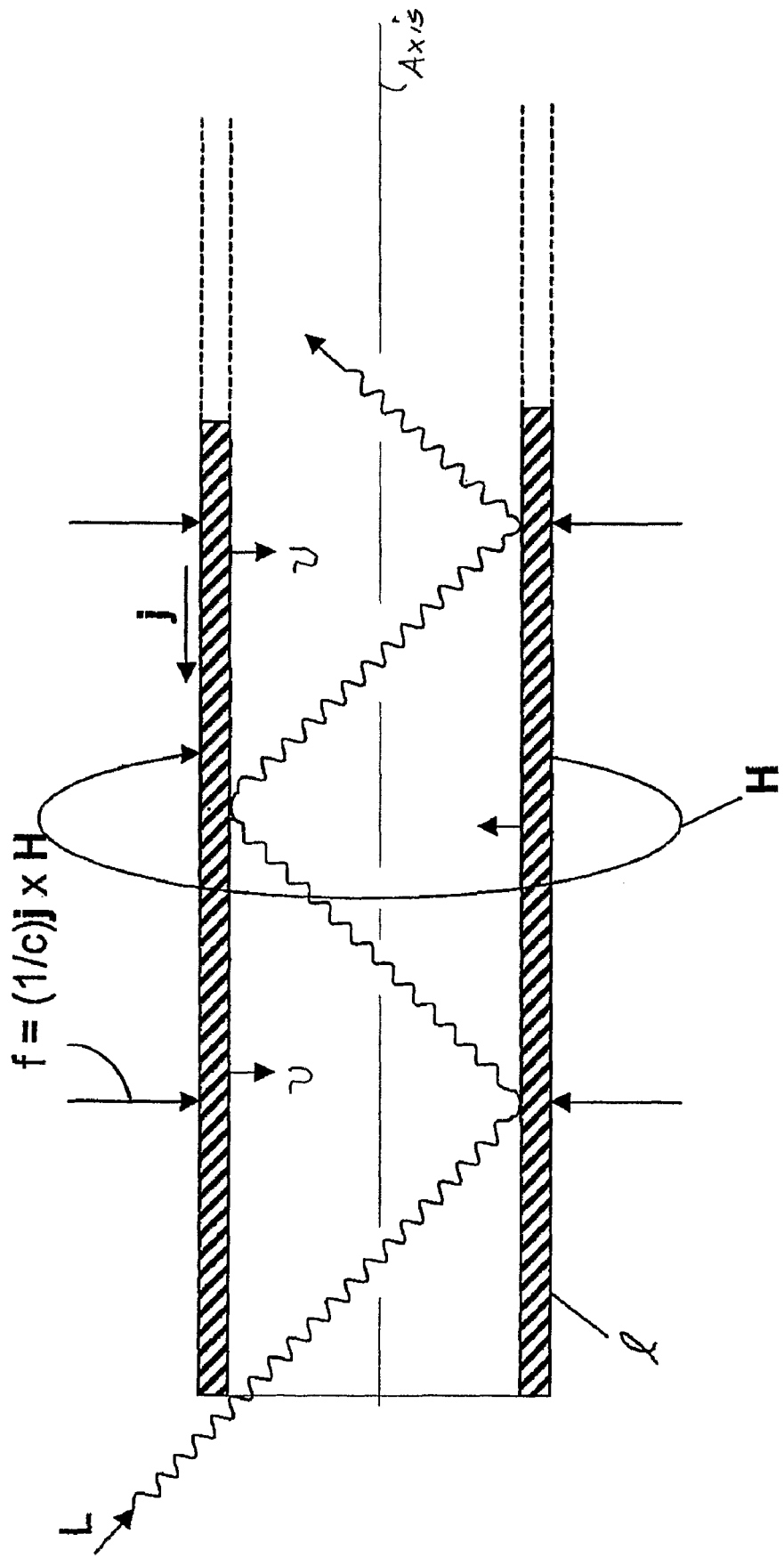
FIG. 1 is a schematic diagram showing entry of a laser beam L into a liner l that is caused to implode at a velocity υ by a Z-pinch force f applied to the liner by application of electric pulse power. In the figure, H is the magnetic field and j is the pinch current.

Laser amplification can be achieved using a "direct drive" scheme as shown in FIG. 1. A laser pulse L propagating from the left in the figure enters the lumen of a reflective (e.g., metallic) liner (having length l) over which a large electric current is discharged, thereby imploding the liner in a Z-pinch manner. As the laser beam propagates through the liner, it reflects back and forth from and between the mutually approaching walls of the imploding liner, which causes the frequency of the beam to rise steadily. With the number of photons in the liner being conserved, the energy of the laser beam is amplified by its conversion to shorter wavelengths. Because the liner behaves as a waveguide for electromagnetic waves, it exhibits a cut-off frequency $v_c \sim c/r$, where c is the velocity of light and r is the inner radius of the liner. Consequently, typically no laser pulse having a frequency less than $v_c$ propagates through the liner. Landau and Lifshitz, *Electrodynamics of Continuous Media*, Pergamon Press, New York, 1960, p. 293 ff.

Amplification of the laser-beam pulse results from the Doppler Effect on light waves reflected back and forth in between the walls of the imploding liner, leading to an increase in frequency with each reflection, given by $$\frac{\Delta v}{v} = 2\frac{v}{c}\cos\alpha, \qquad (1)$$

in which $v$ is the liner-implosion velocity, and $\alpha$ is the entry angle of the incident beam (and also the incidence angle of the beam on the liner wall), with $\alpha=0°$ for a perpendicular incidence. The factor 2 results from the twice-as-large velocity of the light image from the optically reflecting inner wall of the liner.

For the described laser-amplification process, the implosion time $$\tau_{imp} \sim r/v \qquad (2)$$

desirably is shorter than the time $$\tau_L \sim l/c, \qquad (3)$$

in which the laser beam is inside the liner of length l, which means that the laser pulse has a length of less than $c\tau_L = l$. Therefore, $$l \geq (c/v)r. \qquad (4)$$

In an example in which $v \sim 3 \times 10^7$ cm/s and $r \sim 3 \times 10^{-3}$ cm, l is approximately equal to or greater than 3 cm.

Because metallic conductors become transparent to frequencies larger than their electron-plasma frequency $\omega_p$ (wherein $\omega_p \sim 10^{16}$ s$^{-1}$), no amplification would appear possible for wavelengths shorter than $\sim c/\omega_p$. However, even in such an instance, amplification may be achieved by Bragg reflection at glancing angles of incidence.

Laser amplification is inversely proportional to the square of the liner radius. Based on this relationship alone, a 30-fold decrease of liner radius from, for example, $3 \times 10^{-3}$ cm down to $10^{-4}$ cm would increase the laser energy approximately a thousand-fold, for example from an infrared laser pulse having a wavelength of less than $3 \times 10^{-3}$ cm and an energy of $\sim 100$ J, to a 100-kJ laser pulse having a wavelength of $\sim 10^{-6}$ cm in the far-ultraviolet or soft-X-ray domain.

Hence, an infrared terawatt laser pulse having a duration of approximately $10^{-10}$ s could be amplified into a $10^5$-J, soft X-ray, petawatt laser pulse having a duration of $10^{-10}$ second. The energy for the amplification could be produced by a Marx generator, for example.

Laser-Beam Amplification Inside an Imploding Liner

Figure 2:
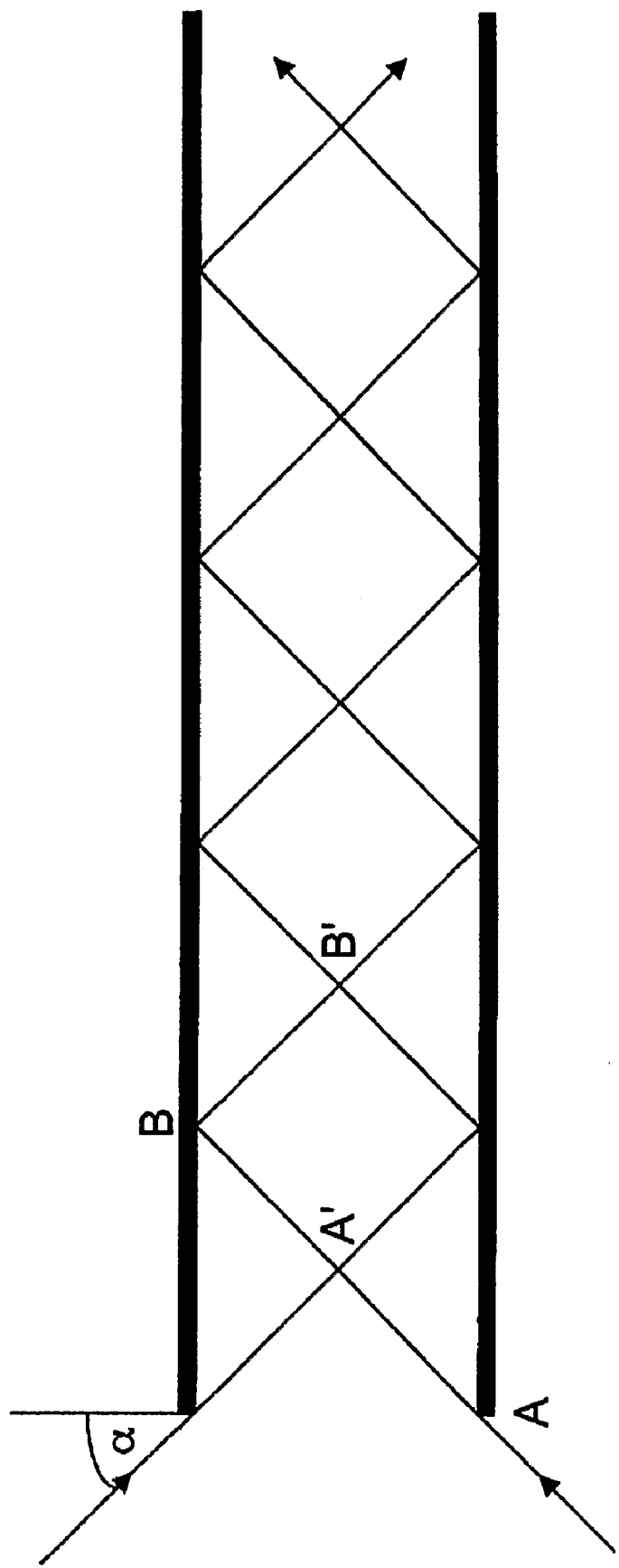
FIG. 2 is a schematic diagram, similar to FIG. 1, but showing entry into the liner of a conical laser beam at an entry angle α. In the time required for a photon to move from A to B at the velocity of light, c, the location of constructive interference is displaced by the distance A' to B' with the group velocity $υ_g$=c sin α.

Referring now to FIG. 2, a conical laser beam is injected into the lumen of the liner at the angle $\alpha$. The positions of nodes of constructive interference inside the liner move to the right (in the figure) at the velocity $v_g$, wherein $$v_g = c \sin \alpha, \qquad (5)$$

and $v_g$ is the group velocity of the laser-light pulse inside the liner.

For the following, it is convenient to consider a reference system that is at rest with the laser-light pulse and that moves with the group velocity $v_g$. If the energy of the laser pulse in a rest frame is W and its volume is V, the energy and volume in the frame at rest with the laser pulse is $$W' = W\sqrt{1-\beta^2}, \beta = v_g/c \qquad (6)$$

and $$V' = V\sqrt{1-\beta^2} \qquad (7)$$

With the radiation-energy density being given by u=W/V, the energy density in the system at rest with the laser pulse is:

$$u' = \frac{W'}{V'} = (1-\beta^2)u. \quad (8)$$

The advantage of going to a frame at rest with the laser-light pulse is that, in such a frame, the photons move only radially, striking the liner wall with a 90° angle of incidence. This makes it easy to compute the radiation pressure in this frame.

If the total number of photons is N, then the fraction N/2 moves at the velocity of light c toward the wall. Also, each of these photons changes its momentum, upon reflection from the wall, by $2h/\lambda = 2h\nu/c$, resulting in a pressure on the wall equal to $$p' = \left(\frac{N}{2}\right) \times 2\left(\frac{h\nu}{c}\right) \times c = Nh\nu = \frac{W'}{V'} = u'. \quad (9)$$

Hence, $$p = u. \quad (10)$$

By comparison, for a photon gas of black-body radiation, p=u/3.

If V' decreases by −dV', the energy W' increases by $$dW' = -p'dV' = -\frac{W'}{V'}dV'. \quad (11)$$

which upon integration yields $$W'V' = \text{const.} \quad (12)$$

Because of Equations (6) and (7), $$WV = \text{const.} \quad (13)$$

With p=W/V, this leads to the equation of state for the photon gas $$pV^2 = \text{const.} \quad (14)$$

By comparison, the equation of state for a photon gas of black-body radiation is $pV^{4/3} = \text{const.}$ With $V = \pi r^2$ being the volume of the lumen per unit length, the pressure and energy density of the photon gas and, respectively, for the laser energy inside the liner are:

$$p = u = \text{const.}/r^4. \quad (15)$$

During compression the laser energy per unit length, $W = \pi r^2 u$, increases as $$\frac{W}{W_0} = \left(\frac{r_0}{r}\right)^2, \quad (16)$$

in which $r_0$ is the initial radius of the liner. With the number N of photons being conserved, whereby $W = Nh\nu$, the laser-light frequency increases in the same proportion by $$\frac{\nu}{\nu_0} = \left(\frac{r_0}{r}\right)^2, \quad \nu_0 < c/r_0 \quad (17)$$

in which $\nu_0$ is the initial laser-light frequency.

Bunching of Laser Pulses During Compression

During reflection from an imploding liner wall, the direction of the laser beam steepens relative to the wall, thereby reducing the angle of incidence α and thus reducing the group velocity $\nu_g = c \sin \alpha$. After many consecutive reflections this could lead to a substantial axial bunching of the laser beam.

Figure 3:
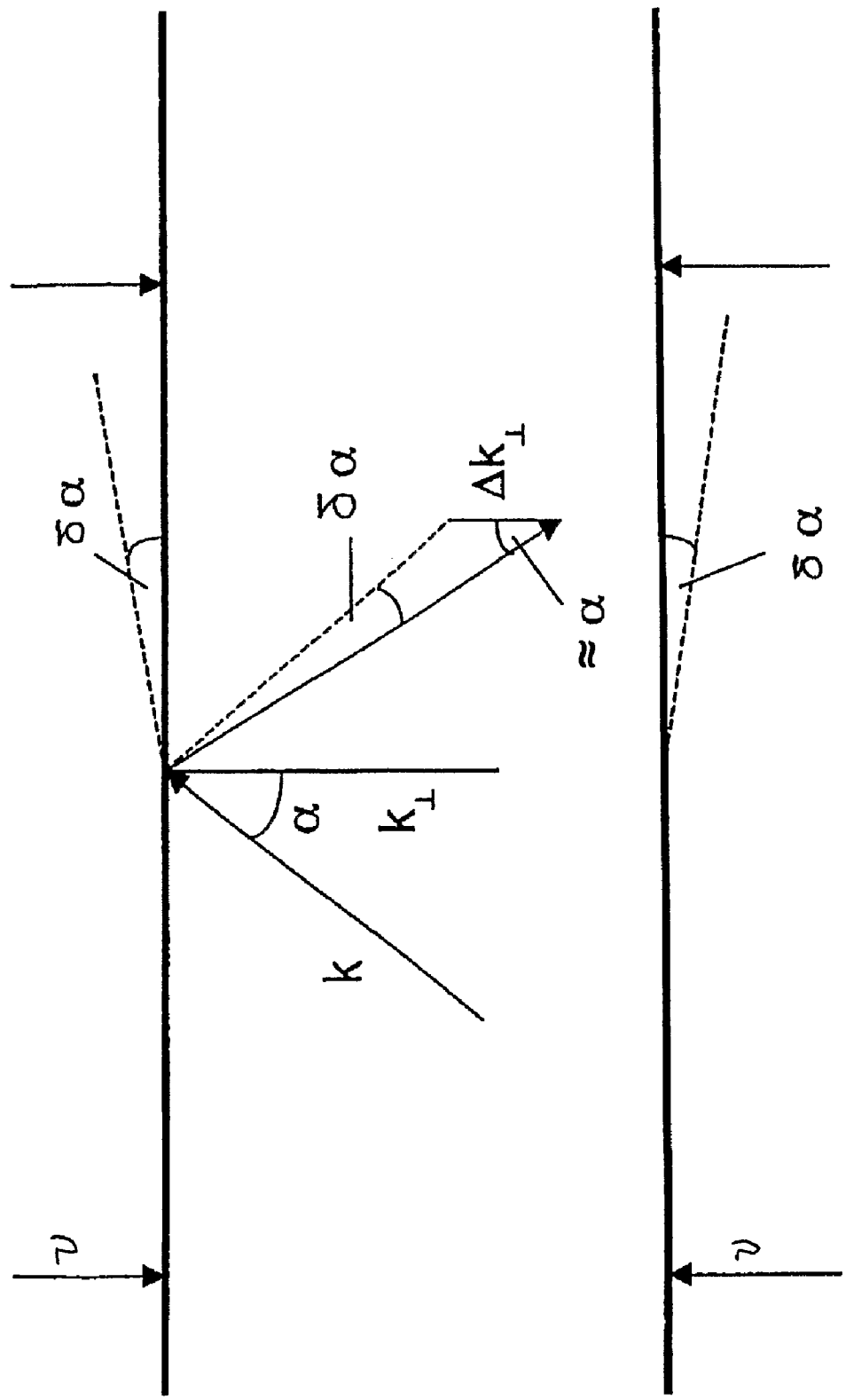
FIG. 3 is a diagram illustrating steepening of the laser beam inside an imploding liner.

The angle of incidence can be kept constant if the liner has the shape of a divergent cone. As illustrated in FIG. 3, during a reflection the perpendicular wave-number component $k_\perp = k \sin \alpha$ is changed by $$\frac{\Delta k_\perp}{k} = 2\frac{\upsilon}{c} = 2\beta, \quad \beta = \frac{\upsilon}{c} \quad (18)$$

in which υ (wherein υ<<c) is the radial liner-implosion velocity. Sommerfeld, *Optik*, Dietrich'sche Verlagsbuchhandlung, Wiesbaden, 1950, p. 314 ff. If δα is the angle by which the angle of incidence α decreases following a reflection from the wall, then the sinus law yields $$\frac{\sin \delta\alpha}{\Delta k_\perp} \simeq \frac{\sin \alpha}{k}. \quad (19)$$

Hence, $$\sin \delta\alpha = 2\beta \sin^2 \alpha. \quad (20)$$

To prevent steepening of the laser beam, taking into account the two reflections from opposite sides of the imploding wall, the opening angle of the capillary liner tube would have to be twice as large as δα. For β<<1 the opening angle of the conical liner shape is expressed as follows:

$$2\delta\alpha \cong 4\beta \sin^2 \alpha. \quad (21)$$

Taking the example of $\beta = 10^{-3}$ and $\sin^2 \alpha \leq 1$, this angle is very small. But, even for $\beta \cong 10^{-2}$, the angle is $2\delta\alpha \leq 4 \times 10^{-2}$ radians $\cong 1°$, which still is quite small.

Scattering from the Liner Wall

Depending upon the smoothness of the liner wall, some scattering of the laser beam will occur into directions other than the directions of scattering occurring by mirror-like reflection. This can be analyzed with the equation of state of a photon gas.

In general, the equation of state for a gas of particles is $$pV^\gamma = \text{const.}, \quad (22)$$

in which $$\gamma = \frac{2+f}{f} \quad (23)$$

is the specific heat ratio of the gas, and f is the number of degrees of freedom exhibited by the particles making up the gas.

Comparing Equation (22) with Equation (14), the photons inside a liner having a perfectly reflecting wall behave like a gas of particles having f=2 degrees of freedom. Such a situation is applicable to a reference system at rest with respect to the group velocity, in which the photons oscillate only in the radial direction (i.e., in two dimensions), giving them f=2 degrees of translational freedom.

If the liner surface scatters the photon isotropically in all three dimensions (which is characteristic of a rough liner surface not exhibiting any significant absorption), then f=3, γ=5/3, and $$pV^{5/3} = \text{const.} \quad (24)$$

Hence, $$W = pV = \frac{const.}{V^{2/3}} = \frac{const.}{r^{4/3}}. \quad (25)$$

Consequently, instead of Equation (16), $$\frac{W}{W_0} = \left(\frac{r_0}{r}\right)^{4/3}. \quad (26)$$

In the limit of black-body radiation with absorption and re-emission from the wall, the equation of state is:

$$pV^{4/3} = const. \quad (27)$$

and $$\frac{W}{W_0} = \left(\frac{r_0}{r}\right)^{2/3}. \quad (28)$$

Accordingly, the black-body radiation corresponds to a gas of particles with three translational and three rotational degrees of freedom, i.e., f=6.

The largest energy amplification occurs under perfect reflection from the wall, going in proportion as $1/r^2$, followed by the amplification for isotropically scattered light, going as $1/r^{4/3}$, with the black-body radiation limit going as $1/r^{2/3}$.

With some scattering from the liner wall the amplification would be between $1/r^2$ (=$1/r^{6/3}$) and $1/r^{4/3}$. If the amplification goes as $1/r^{5/3}$, then a 30-fold reduction in r would amplify W by $(30)^{5/3}$ ($\cong$300-fold) and would amplify W by less than $10^3$-fold if amplification goes as $1/r^2$. For isotropic scattering, wherein f=3 and amplification goes as $1/r^{4/3}$, the amplification would be $(30)^{4/3} \cong$100-fold. For black-body radiation, in which the amplification goes as $1/r^{2/3}$, the amplification limit would be $(30)^{2/3} \cong$10-fold.

The black-body radiation limit corresponds to a dynamic hohlraum configuration where the hohlraum has the shape of a long thin cylinder. Much less energy amplification occurs in a dynamic hohlraum, compared to the energy amplification of a photon gas that is not in thermodynamic equilibrium with its confining wall.

From High-Energy Low Photon Flux to Low-Energy High Photon Flux

In a situation in which the number of photons is conserved, the photon energy is amplified at a fixed photon flux. For many applications, amplification of photon flux at a fixed photon energy is desired. This could be done by filling the liner with a suitable gas (e.g., argon or xenon pumped into an upper laser state) and, as in super-radiance, simultaneously depleted by emitting many lower-energy photons per higher-energy photon.

Direct-Drive Liner Implosion by the Pinch Effect

If m is the mass per liner length, and H is the magnetic field at its surface as set up by a pinch current I (in Amperes, wherein H=I/5r), the equation of motion of the liner is:

$$m\frac{dv}{dt} = \frac{H^2}{8\pi}2\pi r = \frac{H^2 r}{4}. \quad (29)$$

With $H^2 = H_0^2 (r_0/r)^2$, Equation (29) becomes $$m\frac{dv}{dt} = \frac{(H_0 r_0)^2}{4}\frac{1}{r}. \quad (30)$$

With $dv/dt=(\frac{1}{2})dv^2/dr$, integration yields $$\frac{m}{2}v^2 = \frac{(H_0 r_0)^2}{4}\ln\left(\frac{r_0}{r}\right) = \frac{I^2}{100}\ln\left(\frac{r_0}{r}\right) \text{ [erg/cm]} \quad (31)$$

For a thin liner of thickness $\delta$ and density $\rho$, if $m \cong 2\pi r_0 \rho \delta$, Equation (31) can be written as follows:

$$v^2 = v_A^2 \left(\frac{r_0}{\delta}\right)\ln\left(\frac{r_0}{r}\right), \quad (32)$$

where $v_A$ is the Alfvén velocity at $r=r_0$ (wherein $v_A=H_0/\sqrt{4\pi\rho}$). For thin liners, $\delta \sim r_0$. Thus, the implosion velocity is determined by the Alfvén velocity. As an example, if $I=5 \times 10^6$ Amps, $r_0=3 \times 10^{-3}$ cm, and $4\pi\rho \sim 10^2$ g/cm$^3$, then $v_A \cong 3 \times 10^7$ cm/s. Hence, the implosion time is $\tau_{imp} \sim r_0/v_A \sim 10^{-10}$ s.

To obtain the maximum possible laser amplification, ($\frac{1}{2}$)$mv^2$ (given by Equation (31)) is equated with W, which yields $$W = \frac{I^2}{100}\ln\left(\frac{r_0}{r}\right) \text{ [erg/cm]} \quad (33)$$

which is combined with $$\frac{W}{W_0} = \frac{v}{v_0} = \left(\frac{r}{r_0}\right)^2, v_0 > c/r_0. \quad (34)$$

By way of example, let $I=5 \times 10^6$ Amps, $r_0=3 \times 10^{-3}$ cm, $r=10^{-4}$ cm, and $v_0=c/r_0=10^{-13}$ s$^{-1}$. The following are obtained: $W \cong 10^{12}$ erg/cm=$10^5$ J/cm, $W/W_0=10^3$, $v=10^{16}$ s$^{-1}$ and $W_0=100$ J. This indicates that a 1-cm long liner could amplify an infrared 100-J terawatt laser pulse into an ultraviolet $10^5$-J petawatt laser pulse.

"Indirect Drive" Ablative Liner Implosion

As an alternative to imploding a liner by the Z-pinch effect, the liner can be ablatively imploded as in inertial confinement fusion. If ablative implosion is to be performed with electric pulse power, the applied energy desirably is first converted into a burst of soft X-ray black-body radiation inside a hohlraum, in which the radiation ablatively implodes the liner. This can be done by discharging a large current over a cylindrical wire array surrounding the liner. Sanford et al., *Physics of Plasmas* 4:2188 (1997). An advantage of this technique is that it leads to a pulse shortening by about one order of magnitude. Another benefit of this "indirect drive" approach is that it promises a more uniform implosion that reduces the growth of Rayleigh-Taylor instability.

Yet another alternative method for imploding the liner is by application of a hypervelocity impact force to the liner. Such a force can be produced by, for example, directing the shock wave produced by a detonating high-explosive charge at the liner.

Figure 4:
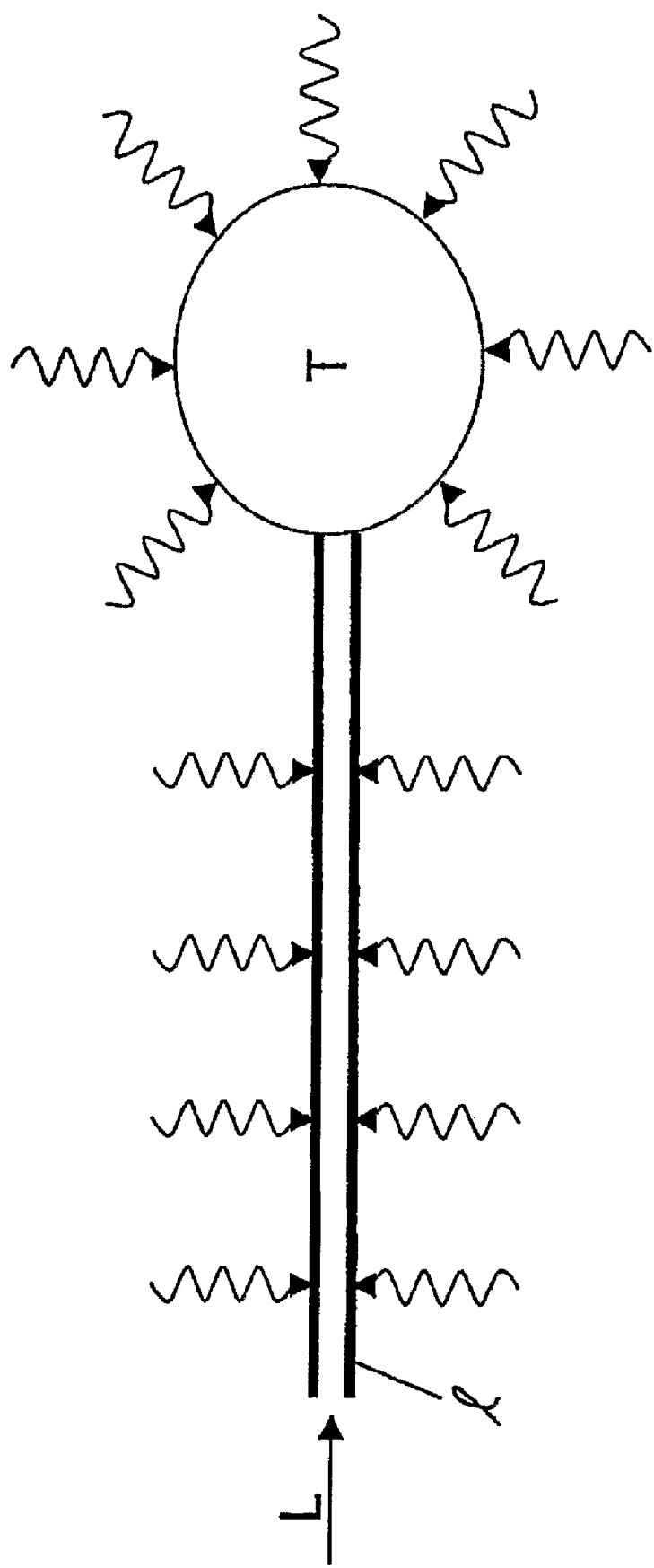
FIG. 4 is a schematic diagram of an embodiment of integrated fast thermonuclear ignition achieved by coupling a laser amplifier to an inertial-confinement fusion target.

An example application for indirect-drive liner implosion is in an integrated apparatus that performs soft X-ray ablative compression of the liner, wherein the amplified laser-light output from the compressed liner is coupled to, and is utilized to perform, a fast-ignition inertial-confinement fusion. An embodiment is illustrated in FIG. 4, in which the depicted apparatus comprises a spherical inertial-confinement fusion target T connected to a proximal end of the laser-beam amplifying liner l. Both the liner l and the target T are imploded inside a hohlraum by soft X-rays produced from the applied electric pulse power. A low-energy laser beam L entering the distal end of the liner l is greatly amplified by the imploding liner, and the amplified beam is used for fast ignition of the target T.

Coupling of the Electric Pulse Power to the Liner Implosion

The energy flux required to implode a liner to an implosion velocity, $\upsilon \sim \upsilon_A$, is determined by the Poynting vector:

$$S = c\frac{E \times H}{4\pi}. \tag{34}$$

With $E=(\upsilon_A/c)H$, one has $$|S| = \upsilon_A \frac{H^2}{4\pi} = \rho \upsilon^3. \tag{35}$$

For a liner of radius r and length l, the power to be applied is $$P=2\pi rl|S|=2\pi rl\rho\upsilon^3. \tag{36}$$

The power should be equal to the electric pulse power (I is current, V is voltage):

$$P=IV. \tag{37}$$

Assuming that I remains constant, the following is obtained (in Gaussian units)

$$V = \frac{I}{c^2}\frac{dL}{dt}, \tag{38}$$

in which the self inductance, L, of a wire of length l and radius r is $$L=2l\log(l/r). \tag{39}$$

Hence, $$\frac{dL}{dt} = -2\frac{l}{r}\frac{dr}{dt} = 2\frac{l}{r}\upsilon_A \tag{40}$$

$$\upsilon_A = -\frac{dr}{dt},$$

and thus, $$P = \frac{I^2}{c^2}\frac{dL}{dt}. \tag{41}$$

With $H=2I/rc$ (in Gaussian units) one then obtains from Equations (40) and (41)

$$P=2\pi rl\rho\upsilon_A^3, \tag{42}$$

which is the same as in Equation (36). Therefore, the impedance must be (in Gaussian units):

$$Z = \frac{1}{c^2}\frac{dL}{dt} = \frac{2l\upsilon_A}{c^2 r} \quad [\text{s/cm}] \tag{43}$$

Conversion into practical units, achieved by multiplying Equation (43) by $10^{-9}$ $c^2$, yields $$Z=2\times 10^{-9} l\upsilon_A/r[\Omega] \tag{44}$$

For example, if $\upsilon_A=3\times 10^7$ cm/s and $2l/r=10^3$, then $Z\approx 30\Omega$.

Assuming highly efficient transfer of energy from the electric pulse power into the laser pulse by putting $W \cong P$, the following are obtained:

$$I=\sqrt{W/Z} \text{ and } V=\sqrt{WZ}. \tag{45}$$

An example is a case of a highly efficient petawatt laser where $W \cong P=10^{15}$ Watts. Electric pulse power of this magnitude is, in theory, attainable with magnetic insulation Winterberg, *Phys. Rev.* 74:212 (1968). The amplification result would be $I \cong 5.8 \times 10^6$ Amps and $V=1.7\times 10^8$ Volts.

A high voltage implies a short discharge time, $\tau$, given by ¼ of the Thomson time (in Gaussian units):

$$\tau = \frac{T}{4} = \frac{1}{4c}\sqrt{LC}. \tag{46}$$

L is given by Equation (39), and the capacitance C is expressed by $$C=l/2 \log(R/r), \tag{47}$$

in which R is the radius of the return-current conductor. Hence, $$\tau = \frac{l}{4c}\sqrt{\frac{\log(l/r)}{\log(R/r)}} \sim l/c. \tag{48}$$

For the example in which $l \sim 10$ cm, $\tau \approx 3\times 10^{-9}$ s.

Spark-gap switches close within $10^{-9}$ s. Thus, using such switches, the discharge time cannot be shorter than $10^{-9}$ s. This requires a lower voltage, which can lead to a reduction in energy-transfer efficiency, going in inverse proportion to the square of the voltage. Hence, it is desirable to employ pulse-power-compression. To some degree such a scheme already exists in the mechanism of the liner implosion, where electric energy is cumulated into kinetic energy of the liner. It is even more realized in the indirect ablative-implosion scheme where, as mentioned above, an approximately 10-fold (or more) pulse-power compression is possible. Sanford et al., *Physics of plasmas* 4:2188 (1997).

Figure 5:
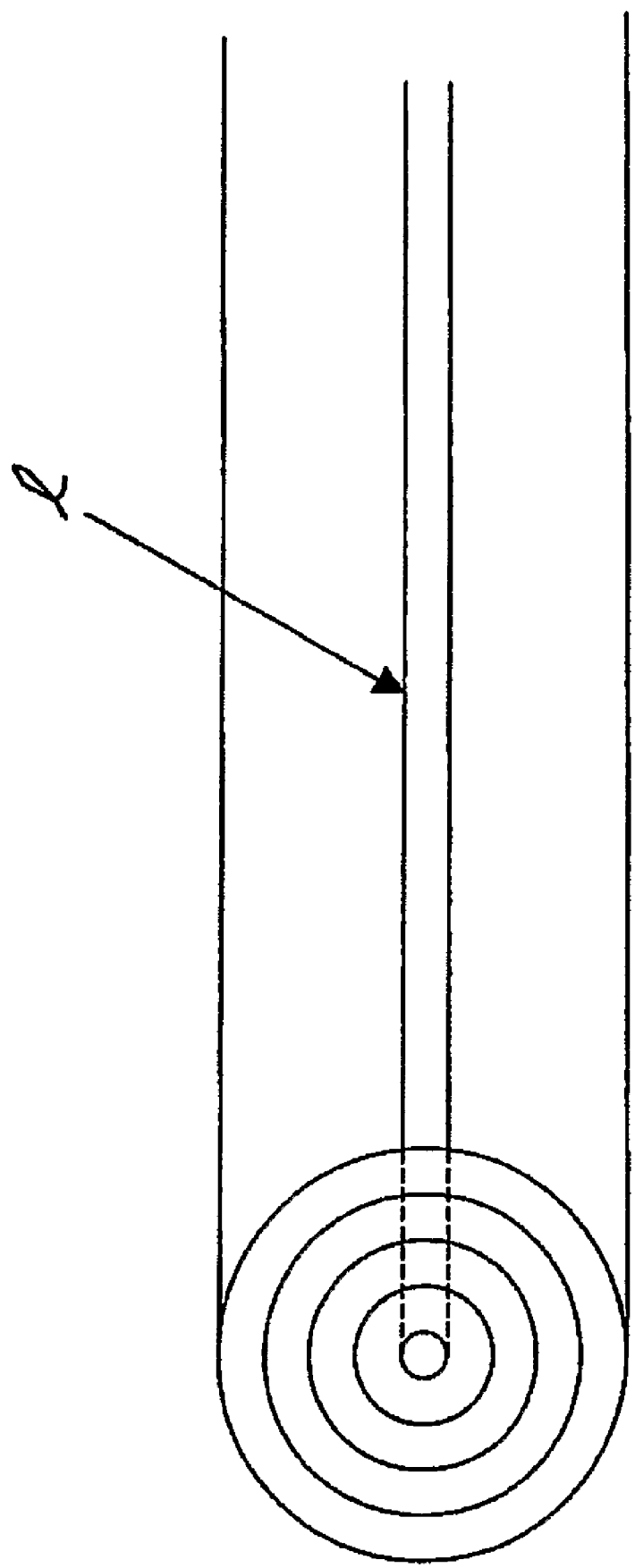
FIG. 5 depicts an embodiment of an implodable liner comprising multiple concentric shells, of which the amplifying liner is the innermost shell.

An alternative manner of using pulse-power compression is by implosion of an array of concentric shells, as shown in FIG. 5. With such an arrangement, in contrast to use of a convergent (e.g., cylindrical) shock wave, a larger rise in the kinetic energy toward the center of the convergence would be possible. Winterberg, *The Physical Principles of Thermonuclear Explosive Devices*, Fusion Energy Foundation, New York, 1981, p. 37 ff. If an approximately 100-fold pulse power compression were achieved in this way, then an electric pulse power input of $10^{13}$ Watts would be sufficient to amplify a laser beam to $10^{15}$ Watts.

Energy Considerations

If e is the laser-beam energy following its amplification in a liner of length l, one has $$e=W\tau, \tag{49}$$

in which $$\tau \cong l/c. \tag{50}$$

Hence, $$l \cong ec/W, \tag{51}$$

which means that l scales as 1/W, leading to large liner lengths for a low laser power W at the same total laser energy e.

Also, since $$\tau \sim r/\upsilon_A, \tag{52}$$

one has $$\upsilon_A \cong (\tau/l)c. \tag{53}$$

Setting, as before, W≅P to have a high transfer efficiency of electric pulse-power laser energy, and expressing P as in Equation (36), one has $$E = W\tau \cong P\tau = 2\pi r^2 l \rho \upsilon_A^2. \tag{54}$$

Hence, with Equation (50), the following is obtained:

$$W \cong 2\pi r^2 \rho \upsilon_A^2 c \tag{55}$$

and $$\upsilon_A \cong \frac{1}{r}\sqrt{\frac{W}{2\pi\rho c}}. \tag{56}$$

This result shows that, at a given energy e, the implosion velocity $\upsilon \sim \upsilon_A$ scales as $W^{1/2}$.

Figure 6:
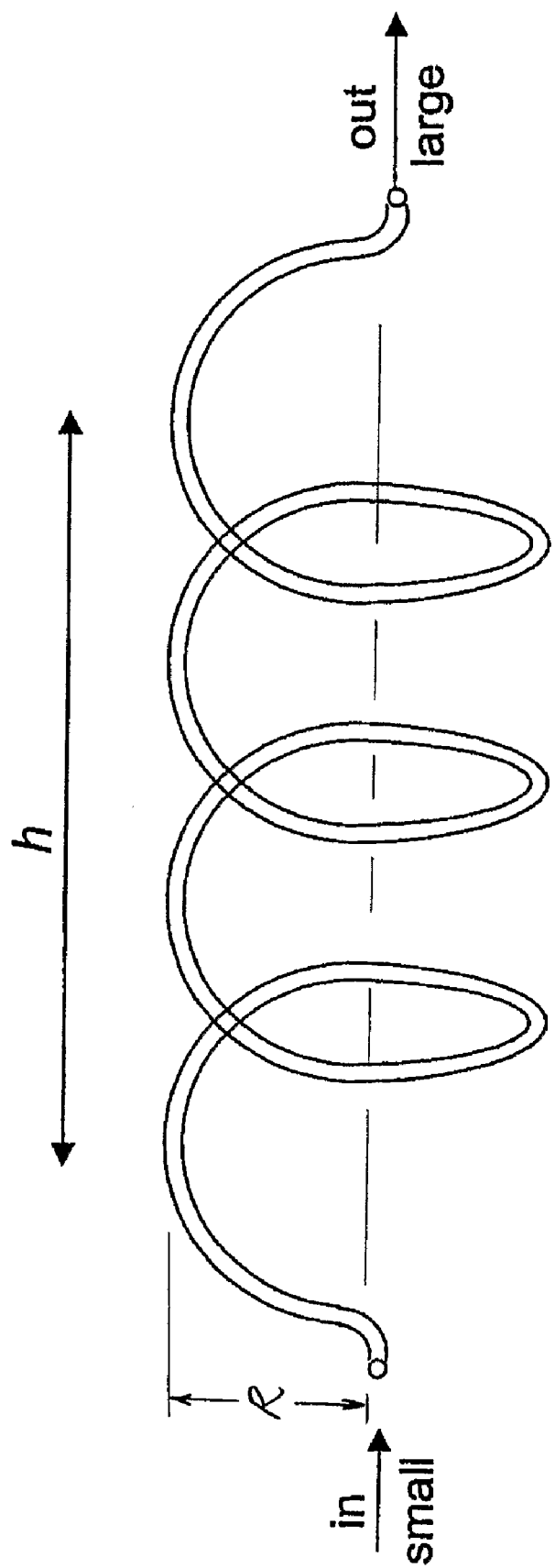
FIG. 6 depicts an embodiment of a liner having length l>>h, wherein the liner has a helical configuration by which the liner is axially compacted into a configuration that can be placed in a hohlraum or other chamber having axial length h<<l.

As an example, let P≅W~$10^{12}$ Watts, τ≅$10^{-8}$ s, and e≅$10^5$ J. It is found that l≅30 cm and υ≅3×$10^6$ cm/s. A velocity of 3×$10^6$ cm/s was estimated as the lower bound to obtain microwave amplification by compression. Linhart, *Plasma Physics*, EURATOM, Brussels, 1969, p. 74 ff. The large length of the liner (l≅30 cm) can be accommodated by deforming it axially (into a helix, for example), forming a structure having a radius R>>r. In such a configuration, shown in FIG. 6, the length of the helically wound liner is $$l = 2\pi RN, \tag{57}$$

in which N is the number of helical turns. If n is the number of turns per unit length, the length h of the helical structure is $$h = N/n. \tag{58}$$

Hence, $$\frac{h}{l} = \frac{1}{2\pi nR}. \tag{59}$$

As an example, if n≅10 $cm^{-1}$ and 2R≅0.3 cm, then h/l≅0.1. In this example the 30-cm long liner would be axially compacted to 3 cm. The direct-pinch-effect drive is impractical for imploding such a structure. A more practical way comprises placing the helix in a small hohlraum or analogous chamber and applying an indirect soft X-ray-induced implosion to the helix.

For liners that are shorter than l≅cτ≅(c/υ)r, the efficiency of conversion of electric pulse power into laser energy is smaller in the same proportion. But, it is nevertheless of utility in the conversion of the laser radiation into laser radiation with lower energy, but with shorter wavelengths.

Laser-Light Absorption by the Liner Wall

Except for the limiting case of laser-light absorption and re-emission from the liner wall (which is in the limit of black-body radiation), the absorption of laser light by the liner wall has so far not been discussed. The reflection coefficient for an electromagnetic wave polarized in a direction that is perpendicular to the direction of incidence is given by:

$$R = \left[\frac{\cos\alpha - \sqrt{(\sigma/\nu) - \sin^2\alpha}}{\cos\alpha + \sqrt{(\sigma/\nu) - \sin^2\alpha}}\right]^2, \tag{60}$$

with a similar expression for polarization that is parallel to the direction of incidence. In Equation (60) σ is the electrical conductivity of the liner. For a good conductor σ is approximately equal to or greater than $10^{18}$ $s^{-1}$, making σ/ν>>1 for typical laser-light frequencies.

For σ/ν>>1 and for perpendicular incidence (α=0), one obtains from Equation (60):

$$R_\perp \cong 1 - 2\sqrt{\nu/\sigma}. \tag{61}$$

For glancing incidence, α=90°−δ, δ<<1, one has $$R_\parallel = 1 - 4(\nu/\sigma)\delta, \tag{62}$$

and $$R_\parallel = 1 - (1 - R_\perp)^2 \delta. \tag{63}$$

An example is silver, where $R_\perp$=0.987 for hv=1 eV, $R_\perp$=0.914 for hv=2.5 eV, and δ≅1°≅$10^{-2}$ radians. Thus, $R_\parallel$=1−1.7×$10^{-6}$ is obtained for 1 eV and $R_\parallel$=1−7.4×$10^{-5}$ for 2.5 eV.

Overcoming absorption losses requires that $$1 - R < \Delta k/k = 2\beta \cos\alpha. \tag{64}$$

For perpendicular incidence (α=0), β=υ/c≅6×$10^{-3}$ for 1 eV and υ/c≅4.3×$10^{-2}$ for 2.5 eV, with implosion velocities ranging from υ≅$10^8$ cm/s to υ≅$10^9$ cm/s. For glancing incidence, 1−$R_\parallel$=(1−$R_\parallel$)²δ<2βδ. Hence, $$(1 - R_\perp)^2 < 2\beta, \tag{65}$$

which for 1 eV yields β being approximately equal to or greater than $10^{-6}$, and for 2.5 eV yields β being approximately equal to or greater than 4×$10^{-5}$, or from υ≳3×$10^4$ cm/s to υ≳$10^6$ cm/s, respectively.

To increase the energy gain (by reflection of the laser-beam photons from the imploding liner wall) over energy loss (through absorption of the photons by the liner wall), the liner lumen can be filled with a gas having a non-linear dependence of refractive index (n) on the laser-light intensity, resulting in n>>1. Thus, the ratio of the implosion velocity υ over the velocity of light c/n is increased by the factor n, and the energy gain by reflection over absorption is increased by the same factor. The gas may be a plasma gas having a non-linear refractive index. Candidate gases include, but are not limited to, $H_2$ plasma gas and He plasma gas. The gas may also include one or more rare-gas monohalides, such as KrF, XeF, KrCl, and XeBr.

Figure 9:
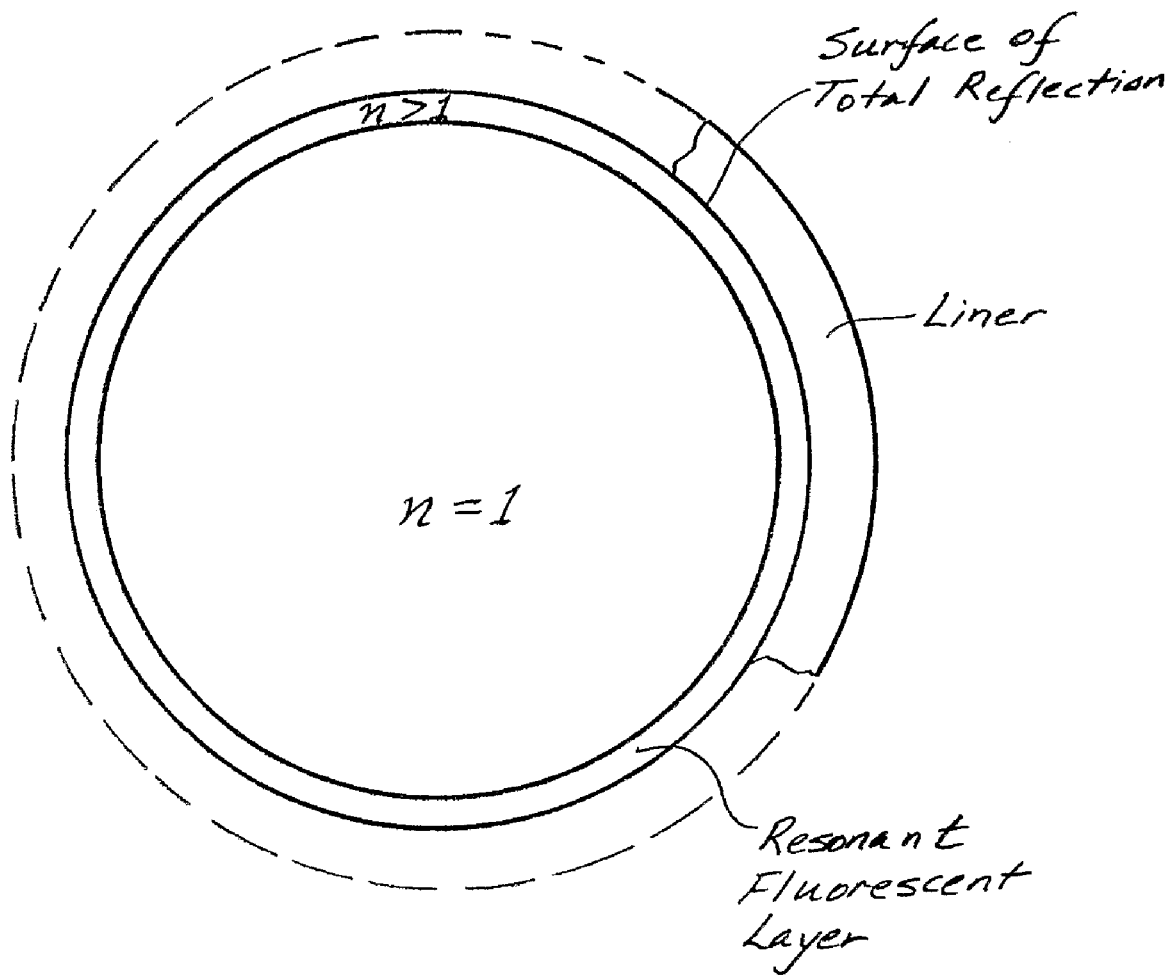
FIG. 9 is a schematic transverse section of an embodiment of a liner that comprises a resonant fluorescent layer.

Alternatively, the liner wall can be coated with any of various substances serving to enhance reflectivity of the liner wall. An example coating thickness is at least a few atomic diameters. For example, as shown in FIG. 9, the inner surface of the liner can be coated with a resonant fluorescent layer having a refractive index n>1. A fraction of the photons, with frequency f entering the fluorescent layer produce inside the layer secondary photons. Each secondary photon has a frequency that is less than the frequency f of the incoming photon. As a result, the trapped secondary photons inside the fluorescent layer are totally reflected at the surface of the layer facing the liner wall. This effect could be sufficient to overcome losses from light-absorption at the surface of the liner. Example fluorescent materials include, but are not limited to, solid argon and any of various plastic materials doped with one or more fluorescent dyes.

With large values of n (i.e., n>>1), the photon gas can undergo a second-order phase transition with an energy gap where the reflection becomes 100%.

Figure 7:
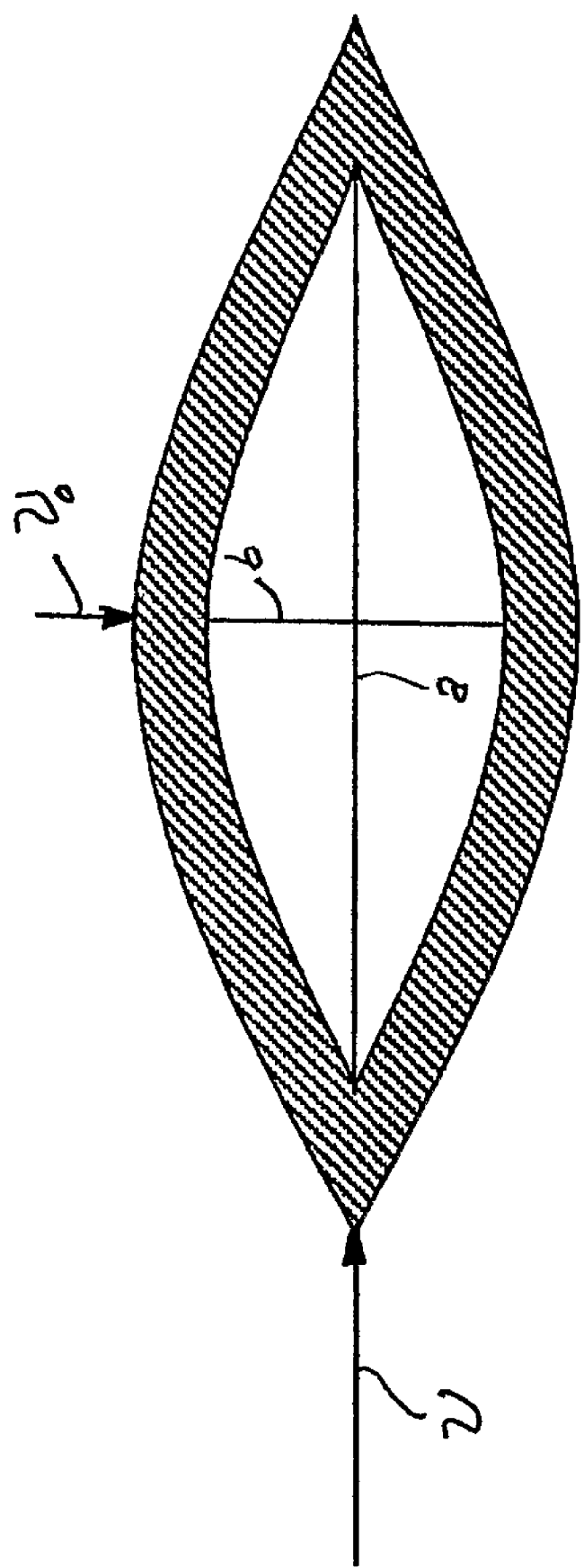
FIG. 7 is a transverse section of an alternative embodiment of a liner having a lenticular cross-section.

Increasing the Implosion Velocity Using a Liner Having a Non-Circular Cross-Section For small angles of incidence of the laser beam to the liner, significant absorption losses may be encountered. One way to overcome these absorption losses is to achieve a sufficiently high implosion velocity. The implosion velocity can be increased by about one order of magnitude by exploiting a "shape-change" effect. A shape-change effect can be realized in one direction with a liner having a non-circular cross-section, such as a lenticular cross-section, as shown in FIG. 7. Note that the sectional profile has major and minor half axes a and b, wherein a>>b.

In this configuration, if the liner is imploded along the minor half axis b at a velocity $\upsilon_0$, then the implosion velocity $\upsilon$ along the major half axis a is a result of a "scissors effect":

$$\upsilon = (a/b)\upsilon_0. \tag{66}$$

At a≳10b, the implosion velocity along the major axis a would be increased 10-fold. The implosion velocity along other directions can likewise be increased with a star-like cross section of the liner, as discussed below.

To prevent jetting from the corners of the scissor, the opening angle of the "scissors" desirably is less than 10°, as experiments with shaped charges have shown. This means that a/b≳20, or $\upsilon \gtrsim 20\upsilon_0$. On the other hand, desirably $\upsilon<<c$ for the photons to be reflected from the mirror formed by the scissors. For the example in which $\upsilon_0=3\times10^7$ cm/s, $\upsilon \gtrsim 6\times10^8$ cm/s and $\upsilon/c \approx 2\times10^{-2}<<1$.

Figure 10A:
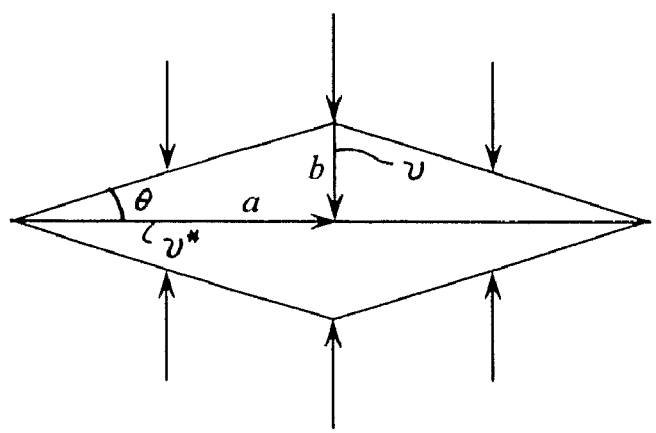
FIG. 10(A) shows a transverse outline of a liner embodiment having a diamond-shaped profile.
Figure 10B:
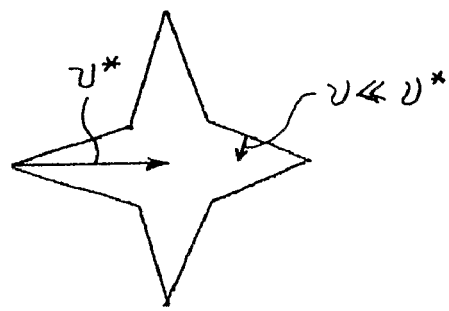
FIG. 10(B) shows a transverse outline of a liner embodiment having a star-shaped profile.
Figure 10C:
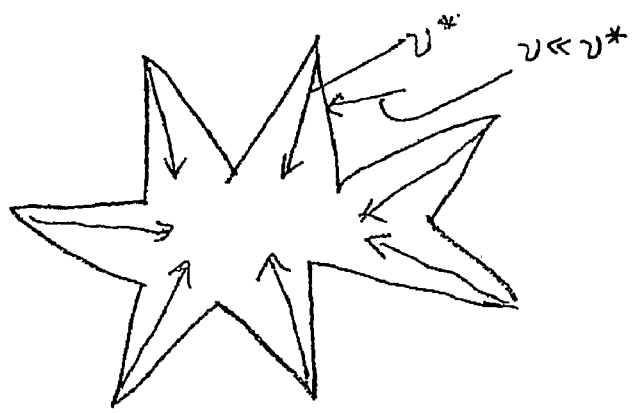
FIG. 10(C) shows a transverse outline of a liner embodiment having a multi-star-shaped profile.

Other liner configurations capable of producing a shape-change effect are depicted in FIGS. 10(A)-10(C), in which FIG. 10(A) depicts a diamond-shaped transverse profile, FIG. 10(B) depicts a four-pointed star-shaped transverse profile, and FIG. 10(C) depicts a multi-star profile. If an interior corner has an angle θ, as shown, then the implosion velocity at the "crease" of the corner is increased by the factor 1/sin (θ/2). Referring to FIG. 10(A), note the two implosion velocities $\upsilon$ and $\upsilon^*$, wherein $\upsilon^* = \upsilon/\sin\theta$. If $\upsilon \sim 3\times10^7$ cm/s, then $\upsilon^* > \upsilon$. With the configuration shown in FIG. 10(C), for example, $\upsilon^* \sim 10\upsilon$ is achievable.

Helical Laser Beam Inside Capillary Liner

Another way in which to reduce absorption losses involves allowing the laser beam to make a large number of glancing reflections from the liner wall. But, if the laser beam were passed through a liner configured as in FIG. 1, optimal results would indicate the desirability of having the liner be very long to make a sufficiently large number of reflections to achieve a large energy amplification. For the liner to be short, the group velocity ($\upsilon_g$) desirably should be much smaller than the velocity of light (c). With the liner configuration shown in FIG. 1, this is achievable if the angle α is small. Unfortunately, in such an event, the absorption losses can be large.

Figures 12A, 12B:
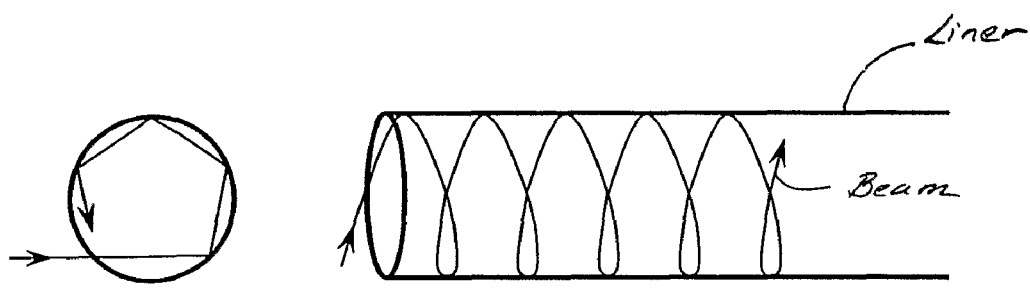
FIGS. 12(A)-12(B) are orthogonal schematic diagrams of an embodiment in which a helical laser beam propagates through a liner.

To overcome this problem the laser beam can be provided, upon injection into the liner, with a large azimuthal velocity component. In making many glancing reflections in the liner, the laser beam spirals down the liner with the group velocity:

$$\upsilon_g = c \sin\phi, \tag{67}$$

in which φ is the pitch angle of the laser beam helix (see FIGS. 12(A)-12(B)). Here, a deflection of 180° is in the limit attained by an infinite number of glancing reflections over a half circle of the helix.

Helical Laser Beam Inside Liner with Non-Circular Cross-Section

Figure 13:
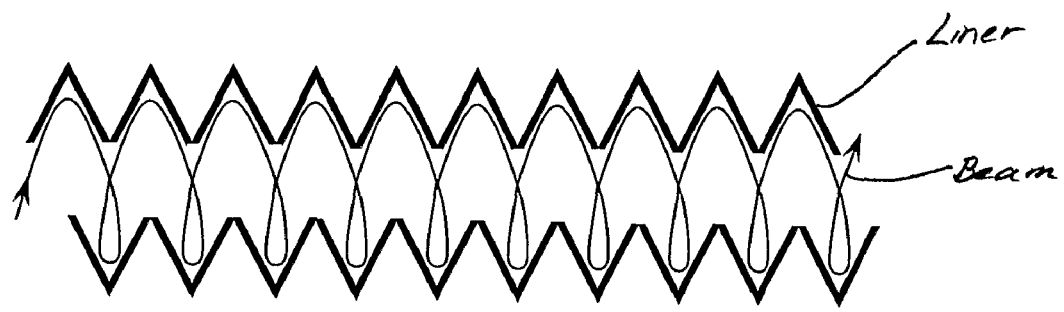
FIG. 13 is a schematic diagram of an embodiment in which a helical laser beam propagates through a liner having a screw-like configuration.

To take advantage of increasing liner-implosion velocity by exploiting the shape-change effect, and of reducing energy losses by using a helical laser beam, the inner and outer liner walls can be configured in the shape of a screw or analogous shape (FIG. 13).

Other Considerations

Two phenomena, which may or may not occur together, can affect the integrity of the inner wall of the liner and reduce its ability to reflect, without absorption, the laser radiation propagating through the liner. These phenomena are Rayleigh-Taylor instability and shock-heating of the liner. To reduce Rayleigh-Taylor instability, a lenticular liner (having a cross-section as shown, e.g., in FIG. 7) can be used, in which the implosion is more like a planar implosion. A benefit of this particular liner geometry is that it does not lead to an azimuthal compression and "crumpling" of the liner, which otherwise would work against maintaining a smooth liner surface. To avoid shock-heating and consequent vaporization of the liner, a multishell liner configuration (e.g., as shown in FIG. 5) can be used, wherein the liner is placed in an externally applied axial magnetic field that acts as a cushion between the colliding shells, thereby avoiding the formation of strong shocks.

Also, as explained in Winterberg, *The Physical Principles of Thermonuclear Explosive Devices*, Fusion Energy Foundation, New York, 1981, p. 37 ff., the liner can be provided with a layered structure, with each layer being made from a different element with a different X-ray reflection resonance, to make the inner liner surface reflective over a broad X-ray spectrum.

Laser-Amplification Method

Figure 8:
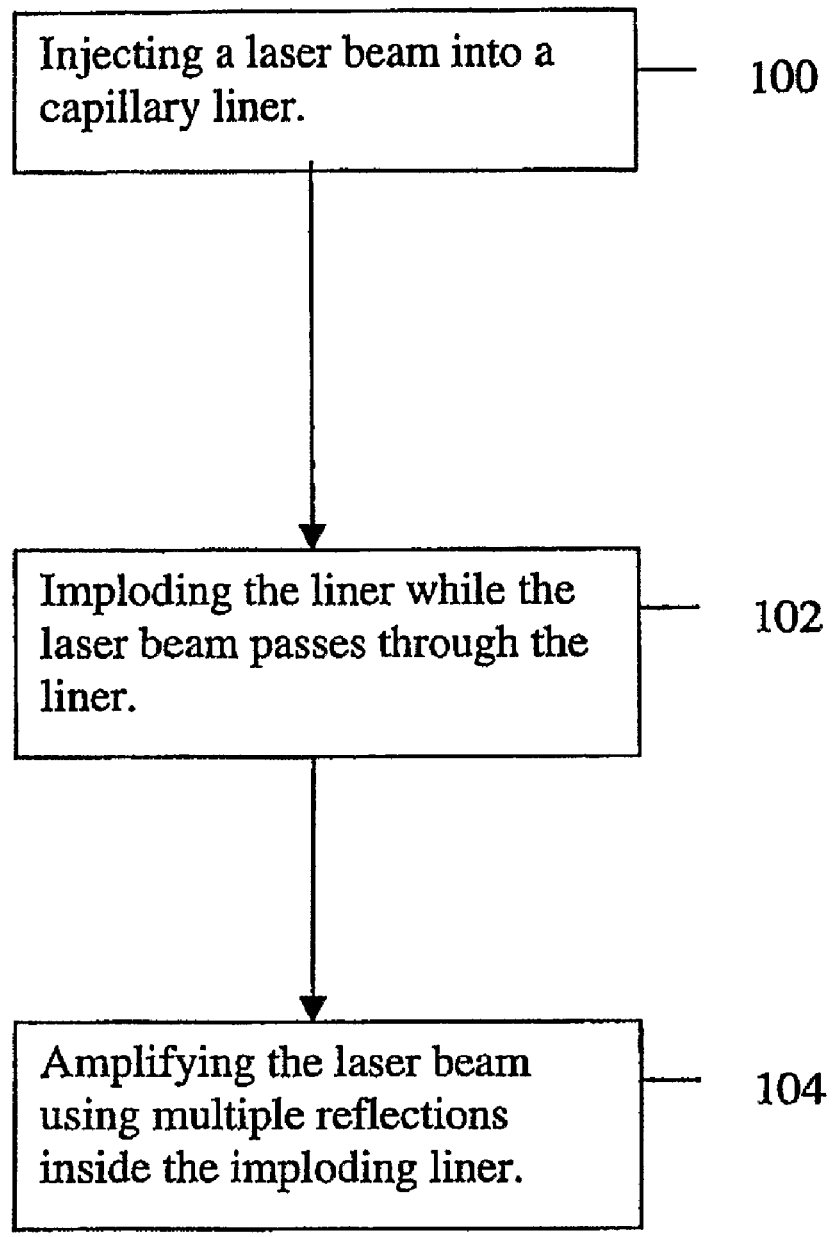
FIG. 8 is a flowchart of an embodiment of a laser-light amplification method.

FIG. 8 is a flowchart of a representative embodiment of a laser-light-amplification method. In step 100, a laser beam is injected into the lumen of a liner (e.g., a capillary liner). In step 102, the liner is imploded as the laser beam propagates through the liner. In step 104, the laser beam is amplified by the multiple reflections of the beam that occur inside the imploding liner.

Applications

An important application of amplification apparatus and methods as disclosed herein is in performing fast thermonuclear ignition. This is because an amplifier as disclosed herein offers a way to overcome the current huge cost of a ~100 kJ petawatt laser. Other important applications are in any of various uses of intense lasers, particularly at shorter wavelengths such as the far-UV and soft X-ray domains. For example, substantial research and development currently are underway in the field of extreme-ultraviolet (EUV) lithography, which would realize enormous benefit from a reliable, clean, relatively inexpensive, and very intense source of the required EUV wavelength of exposure light.

The subject amplification methods and apparatus also may be used for producing highly intense short-wavelength laser light. Such highly intense laser sources have a myriad of uses ranging from various military uses as well as various illumination and exposure technologies, such as extreme ultraviolet (EUV) and X-ray lithography. Yet another use of intense short-wavelength laser light is in triggering chemical reactions. Further uses include use in any of various non-destructive testing methods and use for short-wavelength microscopy.

In addition, the laser beam itself may be used as a pump source to pump a gas laser in the liner. The gas laser may include, but is not limited to, Ar and Xe.

In a laser amplifier as disclosed herein, laser transparency can be utilized as a diagnostic of liner implosion. In addition, wavelength shifts may be used for characterizing implosion velocity versus time.

Laser amplification may be performed in any suitable environment, including in a vacuum environment, which would avoid all non-linear phenomena in laser-gain media.

Compression and Amplification of an Electron Beam

As an alternative to compressing a photon beam for amplification purposes, similar principles as discussed above can be exploited to compress and amplify an electron beam, in particular a relativistic electron beam. Such an electron beam is guided into a liner by a laser beam, as described in Winterberg, *Physics of Plasmas* 11:3955 (2004). To space-charge-neutralize the electron beam, the liner desirably is filled with a tenuous gas or plasma.

Figure 11:
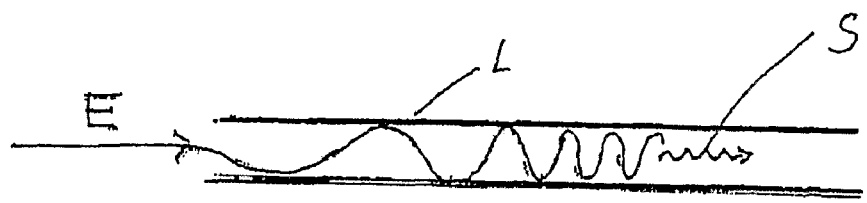
FIG. 11 schematically depicts a liner embodiment configured to receive and amplify an electron beam E and produce therefrom amplified synchrotron radiation S.

With its non-vanishing current, the electron beam during its compression inside the imploding liner is reflected from the liner wall by image currents induced in the liner wall, similar to the mirror reflection of a photon beam from the liner wall. With the energy of the electron beam, as in the case of a photon beam, rising in proportion to $1/r$, the electrons execute transverse oscillations in a direction perpendicular to the direction of beam propagation. Thus the electrons become a source of intense synchrotron radiation into the far-UV and X-ray domains. Since, during the compression of the beam, the electrons become highly relativistic, the synchrotron radiation is directed within a narrow angle in the same direction as the propagation direction of the beam (see FIG. 11).

As a compression-amplified photon beam, the synchrotron-radiation beam can be used for performing fast ignition of thermonuclear assemblies.

What is claimed is:

1. A method for producing synchrotron radiation, comprising:
    providing a liner having a first end, a second end, a liner axis, and a lumen extending along the liner axis and being bound by interior reflective walls of the liner;
    introducing charged particle beam into the first end of the liner such that the beam propagates through the lumen from the first end to the second end as the beam reflects multiple times from the interior walls of the liner; and
    applying an implosive force to the liner as the beam propagates through the lumen of the liner, the implosive force serving to compress the interior walls implosively toward the liner axis in a manner that produces synchrotron radiation as the beam propagates through the lumen of the imploding liner.

2. The method of claim 1, wherein:
    the charged particle beam is an electron beam;
    reflection of the electron beam from the interior walls produces a beam of synchrotron radiation that propagates through the liner.

3. The method of claim 2, wherein electrons of the electron beam are reflected from the interior walls by inducing image currents in the interior walls.

4. The method of claim 1, wherein the implosive force is applied by application of electric pulse power to the liner.

5. The method of claim 1, wherein the implosive force achieves a Z-pinch of the liner as the implosive force compresses the interior walls of the liner.

6. The method of claim 1, wherein the implosive force is applied by irradiating the liner with electromagnetic radiation.

7. The method of claim 1, wherein the implosive force is applied by applying an ablative implosion force to the liner.

8. The method of claim 1, wherein the implosive force is applied by application of a hypervelocity impact force to the liner.

9. The method of claim 1, wherein the beam is introduced into the lumen of the liner such that at least some of the reflections of the beam from the interior walls are at glancing angles of incidence.

10. The method of claim 1, wherein the implosive force is applied in a manner by which one portion of the liner implodes at a greater velocity than another portion of the liner.

11. The method of claim 1, wherein:
    the liner is wound in an axially compact manner; and
    the implosive force is applied by placing the axially compact liner in a hohlraum and applying an indirectly induced implosive force to the liner.

12. The method of claim 1, further comprising:
    adding to the lumen a gas capable, when pumped, of exhibiting laser action; and
    pumping the gas in the lumen with the synchrotron radiation to produce second-stage light by optical amplification.

13. The method of claim 1, further comprising adding to the lumen a gas exhibiting a non-linear dependence of refractive index (n) on laser-light intensity, resulting in n☐1, so as to increase a ratio of implosion velocity over the velocity of light c/n by n.

14. The method of claim 1, wherein the interior reflective walls are coated with a resonant fluorescent layer having a refractive index $n>1$.

15. The method of claim 1, wherein the implosive force is applied to the liner in a manner that provides the lumen with convergence or divergence that progresses from the first end to the second end as the liner is being implosively compressed.

16. The method of claim 1, wherein the beam, while being introduced into the lumen, is provided with a large azimuthal velocity component.

17. The method of claim 1, wherein the implosive force is applied to the liner uniformly radially inward toward the axis.

18. The method of claim 1, wherein the implosive force is applied to the liner in a manner in which a greater force is applied in one direction toward the axis than in another direction toward the axis.

19. The method of claim 1, further comprising:
    placing multiple shells around the liner; and
    before or while applying the implosive force, placing the liner and shells in an axial magnetic field to form a cushion between the shells during implosion.

20. An apparatus for producing synchrotron radiation, comprising:
    a liner comprising a first end, a second end, and walls that include interior surfaces defining a lumen extending along an axis, the interior surfaces being reflective to a charged particle beam;
    means for introducing a charged particle beam into the first end of the liner such that the beam propagates through the lumen from the first end to the second end as the beam reflects multiple times from the interior surfaces; and
    implosion means for applying an implosive force to the liner as the beam propagates through the lumen, the implosive force being sufficient to compress the walls toward the axis in a manner that produces synchrotron radiation as the beam propagates through the lumen.

21. The apparatus of claim 20, wherein the lumen has a cylindrical transverse profile before compression.

22. The apparatus of claim 20, wherein the lumen has a non-circular transverse section before compression.

23. The apparatus of claim 22, wherein the transverse section is lenticular.

24. The apparatus of claim 20, wherein the lumen is configured to exhibit, during compression of the liner, divergence or convergence from the first end to the second end.

25. The apparatus of claim 20, wherein the liner comprises at least one surrounding shell that is compressed, along with the liner, by the implosion force applied by the implosion means.

26. The apparatus of claim 20, wherein the liner is axially compacted.

27. The apparatus of claim 26, wherein the liner has a helical configuration.

28. The apparatus of claim 27, wherein the implosion means comprises:
a hohlraum, into which the liner is placed for application of the implosive force; and
means for applying a burst of radiation to the liner in the hohlraum.

29. The apparatus of claim 20, wherein the lumen is configured to exploit a shape-change effect during implosion of the liner.

30. The apparatus of claim 20, wherein the liner comprises at least one metal.

31. The apparatus of claim 20, wherein the liner lumen contains a gas having a non-linear dependence of refractive index (n) on the laser-light intensity, resulting in n□1.

32. The apparatus of claim 20, wherein the interior surfaces of the liner are coated with a reflection-enhancing substance.

33. The apparatus of claim 32, wherein the reflection-enhancing substance is a resonant fluorescent material having a refractive index n>1.

34. The apparatus of claim 20, wherein the walls of the liner, including the interior surfaces, are screw-shaped.

35. The apparatus of claim 20, further comprising a hohlraum containing the liner and into which the implosion means applies the implosive force to the liner.

36. The apparatus of claim 20, wherein the implosion means applies a Z-pinch implosive force to the liner.

37. The apparatus of claim 20, wherein the implosion means comprises means for ablatively imploding the liner.

38. The apparatus of claim 37, wherein the means for ablatively imploding the liner comprises a hohlraum and means for producing in the hohlraum a burst of black-body radiation directed to the liner.

39. The apparatus of claim 20, wherein the implosion means comprises:
means for producing the implosive force; and
means for coupling the implosive force to the liner.

40. The apparatus of claim 39, wherein the means for coupling is configured to achieve a direct-drive coupling of the implosive force to the liner.

41. The apparatus of claim 40, wherein the direct-drive coupling produces a Z-pinch of the liner.

42. The apparatus of claim 39, wherein the means for coupling is configured to achieve an indirect-drive coupling of the implosive force to the liner.

43. The apparatus of claim 42, wherein the indirect-drive coupling produces ablative implosion of the liner.

44. A method for igniting a fusion target, comprising:
providing a liner having a first end, a second end, a liner axis, and a lumen extending along the liner axis and being bound by interior reflective walls of the liner;
introducing a charged particle beam into the first end of the liner such that the beam propagates through the lumen from the first end to the second end as the beam reflects multiple times from the interior walls of the liner;
applying an implosive force to the liner as the beam propagates through the lumen of the liner, the implosive force serving to compress the interior walls implosively toward the liner axis in a manner that produces synchrotron radiation as the beam propagates through the lumen of the imploding liner, thereby producing a synchrotron radiation beam; and
directing the synchrotron radiation beam to the fusion target.

45. The method of claim 44, wherein the target is an inertial-confinement fusion target.

46. An apparatus for igniting a fusion target, comprising:
a liner comprising a first end, a second end, and walls that include interior surfaces defining a lumen extending along an axis, the interior surfaces being reflective to an energy beam;
means for introducing a charged particle beam into the first end of the liner such that the beam propagates through the lumen from the first end to the second end as the beam reflects multiple times from the interior surfaces;
implosion means for applying an implosive force to the liner as the beam propagates through the lumen, the implosive force being sufficient to compress the walls toward the axis in a manner that produces synchrotron radiation as the beam propagates through the lumen, thereby producing a synchrotron radiation beam; and
means for directing the synchrotron radiation beam to a fusion target.

47. The apparatus of claim 46, wherein the fusion target is an inertial-confinement fusion target.

48. The apparatus of claim 46, further comprising a hohlraum, wherein both the liner and the fusion target are imploded in the hohlraum.

49. A method for producing synchrotron radiation, comprising:
injecting a charged particle beam into a liner;
imploding the liner as the beam propagates through the liner; and
allowing the beam, as the beam propagates through the imploding liner, to undergo multiple reflections inside the liner, the reflections serving to produce synchrotron radiation.

* * * * *